UNITED STATES PATENT OFFICE.

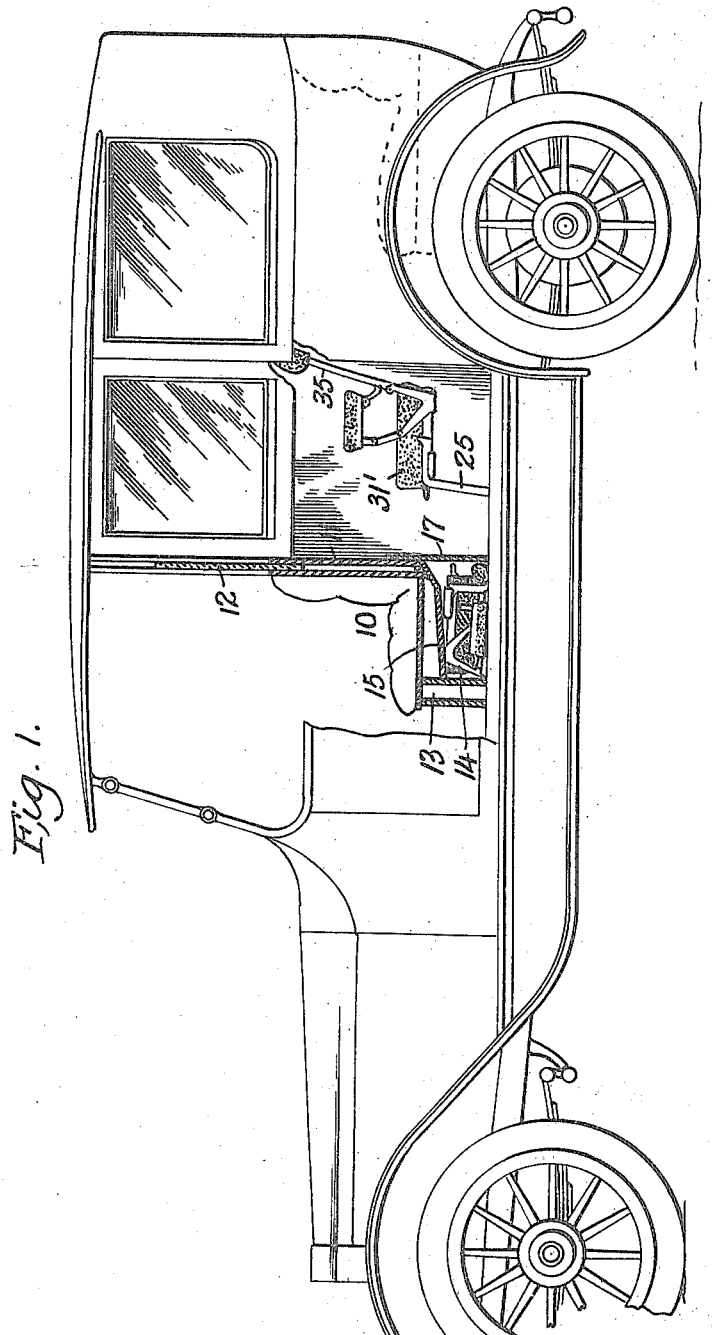

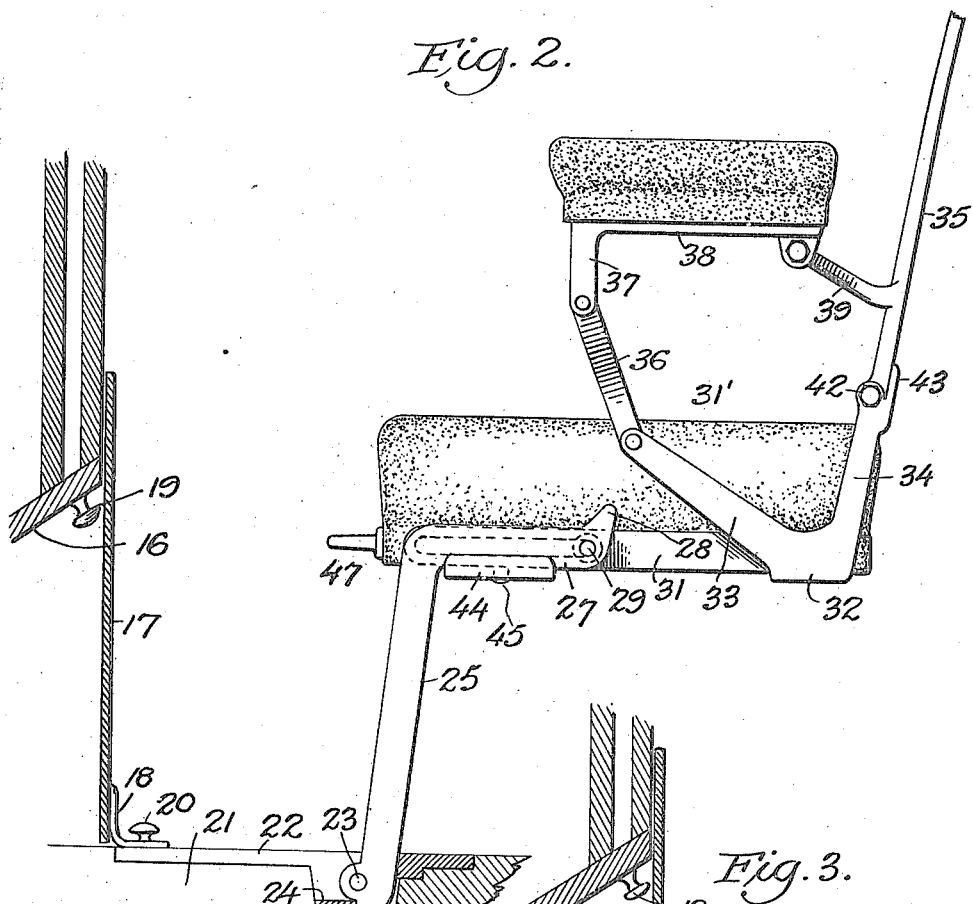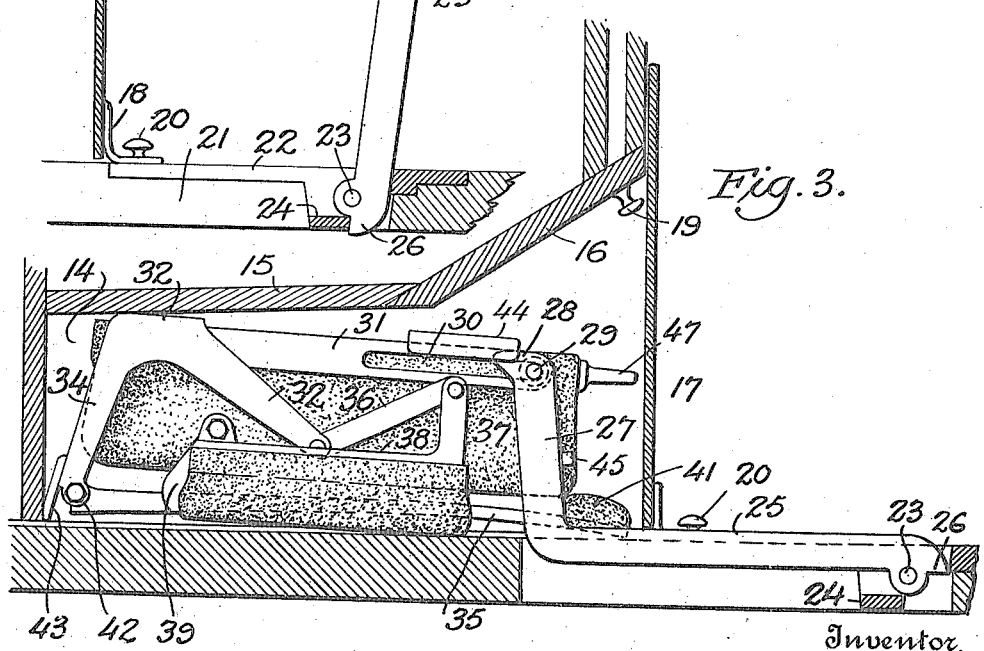

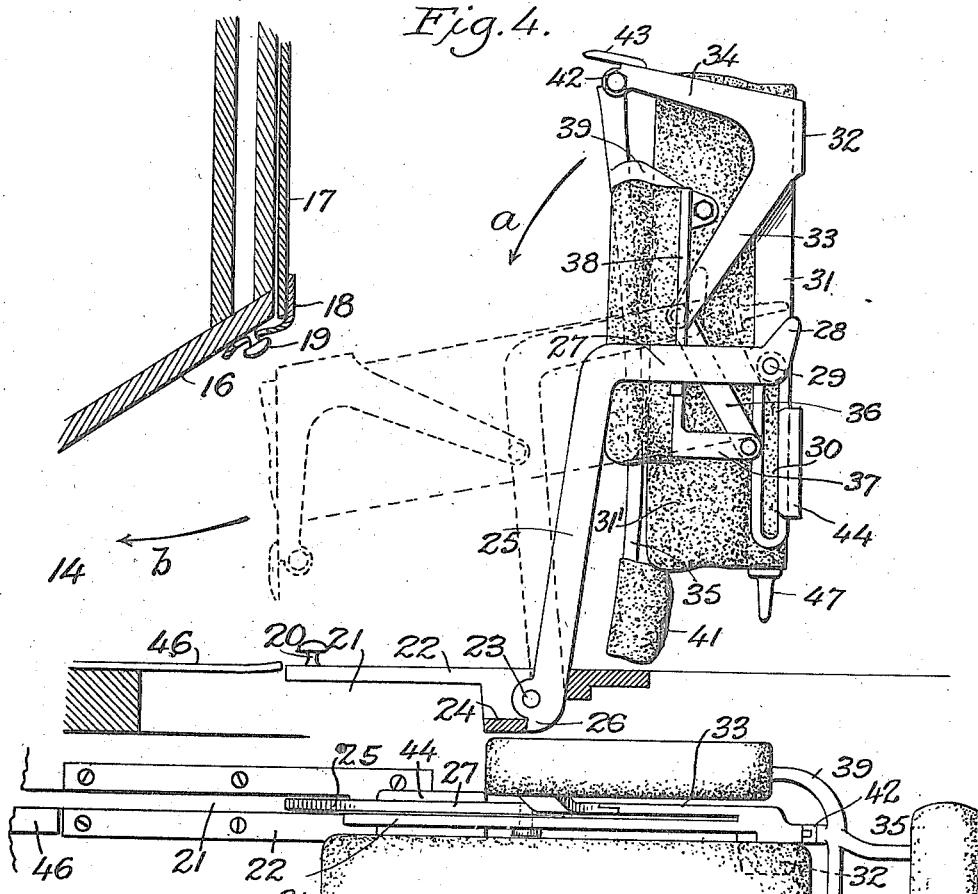

WILLIAM A. HENDERSON, OF LARCHMONT, NEW YORK, ASSIGNOR TO HOLBROOK COMPANY, OF NEW YORK, N. Y., A CORPORATION OF NEW YORK.

VEHICLE-SEAT.

1,248,853. Specification of Letters Patent. Patented Dec. 4, 1917.

Application filed February 8, 1917. Serial No. 147,475.

*To all whom it may concern:*

Be it known that I, WILLIAM A. HENDERSON, a citizen of the United States, and resident of Larchmont, in the county of Westchester and State of New York, have invented certain new and useful Improvements in Vehicle-Seats, of which the following is a specification.

This invention relates to vehicle seats and especially to collapsible and disappearing seats to be used temporarily or in small spaces within a vehicle and which are adapted to be opened for use where a greater number of passengers than usual are to be provided for and when not needed may be released to fall automatically into a recess beneath the front or driver's seat of the vehicle. The construction and arrangement of the device provides for a substantial cushioned seat, side arms and back rest, all of which may be compactly folded and quickly deposited in the compartment for the same, and these and other details and objects of the invention will be more fully described in the following specification, set forth in the claims hereto appended and illustrated in the accompanying drawings, wherein:

Figure 1 is a side elevation of a motor vehicle partly broken away and showing two seats in different positions.

Fig. 2 is an enlarged elevation of the improved seat opened for use.

Fig. 3 is a side view of the same seat folded and deposited in its compartment.

Fig. 4 is a side view of the seat illustrating the operation of folding and depositing the seat.

Fig. 5 is a plan view of the seat opened.

As will be seen in Fig. 1 the distance between the rear and the front or driver's seats in a motor car of the larger type is considerable and after the occupants of the rear seats have entered the car and seated themselves, abundant room remains for other seats and passengers. The seats generally provided under such circumstances are small pivotal contrivances affording no comfort and so arranged against the front seat that the appearance of the interior of the car is marred while the seats afford a lodging for dust and dirt and prevent the ready operation of any front shield or partition that may be used.

The object of the present invention is to completely hide the seat when not in use, to so construct the seat that it may be cushioned and upholstered to provide a comfortable seat, to provide back and side arms to simultaneously fold, a seat which with one movement will locate itself either for use or storage and to permit of the location of a disappearing or adjustable shield back of the driver's seat.

In the drawings the driver's seat 10 is cushioned as usual and has a recess 11 at its back to receive the sliding shield or partition 12 and a tool box 13 and the compartment 14 are located beneath the seat. The top 15 of the compartment 14 is inclined and has a flaring mouth 16 closed by a sliding door 17 with a loop 18 to engage either of the buttons 19 or 20 to hold the door up or down when the seat is being located.

In the floor of the car and partly within and partly without the compartment are slots 21 protected at the outside of the compartment by a plate 22 carrying a pivot pin 23 and a stop 24, the former supporting the swinging leg 25 and permitting it to stand erect as in Fig. 2 or to be thrown down into the position shown in Fig. 3.

When the leg 25 is upright it is inclined slightly to the rear of the vertical and a shoulder 26 at the lower end of the leg engages the stop 24 and its backward movement thereby limited. The upper end of the leg comprises an angular extension 27 having a nose 28 at its extremity where is also located a stud 29 adapted to pass through a slot 30 and having a head to retain it therein, the slot 30 being in a plate 31 secured to each side of the seat body 31'.

The plate 31 has flanges 32 extending beneath the frame of the seat body and arms 33 and 34, the latter having the back frame 35 hinged to it while the former is connected by means of a link 36 with the depending arm 37 of a plate 38 carrying the side arm 39 of the seat. The rear end of the plate 38 is supported by the arm 39 from the back frame and hinged thereto.

The back frame also comprises the cross bar 40 and the cushioned bar 41 and at the hinge 42 is a lip 43 to limit the backward movement of the frame.

The seat body is supported, in addition to the stud 29, by a ledge 44 from the plate 31 and a pin 45 from the extension 27 enters a perforation in the ledge and prevents the longitudinal movement of the seat.

When it is desired to remove the seat from the interior of the car, the back frame 35 is thrown down upon the seat body as shown in Figs. 3 and 4, the first movement being shown in the latter view where an arrow $a$ shows how the seat body is further tilted on the stud 29 into the position shown in dotted lines with the legs swung forward and from whence the seat may be thrown into the direction shown by the arrow $b$ into the mouth 16 and compartment 14.

After the seat leaves the position shown in full lines in Fig. 4 the action is entirely automatic and the fall of the seat causes the lip 43 at each side of the seat to strike the rails 46 and the impetus from the fall of the legs 25 with their load will cause the seat to shoot into the compartment 14 and into the position shown in Fig. 3.

In thus depositing the seat in its compartment it will be seen that it is given a complete revolution, throwing the cushion, back and arms on the under side so former is given abundance of space in the compartment and while the lip 43 limits the movement of the seat at the rear of the compartment, the lower side of the seat is wedged under the inclined top 15 preventing any movement and consequent noisy or injurious rattling.

When the seat is deposited in the compartment the legs 25 lie on floor of the car and extend upward only about the thickness of the carpet thereon, thus forming a flush flooring, and the door 17 may be pulled down to cover any opening.

To deposit the seat practically one movement only is resorted to after folding down the back and this is to tip and push forward the rear end of the seat and the impetus of this movement and gravity do the rest.

To set-up and unfold the seat it is drawn out of the door when the latter is raised by means of the handle 47 which carries the stud 29 to the end of the slot 30 and past the center of gravity when the seat is in its operative position. If pulled out with the necessary force the rear of the seat will be swung into its proper position with one movement.

The invention therefore provides a comfortable arm and back seat for distance riding, capable of being set-up or stored with one movement and leaving the interior of the car unmarred with unsightly projections.

It is obvious that the parts may be otherwise arranged or modified without departing from the essential features above described or from the scope of the appended claims.

What I claim is:

1. In a vehicle seat, the combination with a seat having slots at each side and adapted to be impelled and automatically stored or set up, of legs pivoted at the bottom of the vehicle, studs at the outer ends of the legs and sliding in the slots of the seat and supporting the same, and a folding back and arms.

2. In a vehicle seat, the combination with a collapsible and revoluble seat having slots at its sides, of legs pivoted at the bottom of the vehicle, studs at the outer ends of the legs and operating in the slots, a compartment to receive the collapsed seat, and means for impelling the seat when collapsed to house or set up the same.

3. In vehicle seats, the combination with a collapsible and revoluble seat body having slots in each side, of a compartment with a sliding door, legs pivoted in the floor of the vehicle and having angular extensions, studs at the outer ends of the extensions to play in the slots and allow the seat to revolve on them, means for allowing the seat to shift either side of the center of gravity, and means for shifting and revolving the seat.

4. In a vehicle seat, the combination with a revoluble and collapsible seat, of arms, a back, slotted plates in the floor of the vehicle, legs pivoted in the plates and having angular extensions, pivots at the ends of the extensions, slotted plates at the sides of the seat and adapted to receive the pivots, a compartment with an inclined roof, and a handle to impel the seat.

5. In a vehicle seat, the combination with a seat body having a collapsible back and side arms, of slotted plates secured to the floor of the vehicle, legs pivoted in the plate and having angular extensions, studs in the ends of the extensions, slotted plates at each side of the seat to receive the studs, lips at the back of the plate, rails on the floor of the vehicle to receive the lips, a compartment with an inclined roof and inclosing the rails, ledges on the plates to engage the angular extensions, a stop and a shoulder on each leg, means connecting the back and side arms to cause them to collapse together, and a handle to operate the seat.

Signed at New York, in the county of New York, and State of New York, this 31 day of January A. D. 1917.

WILLIAM A. HENDERSON.